United States Patent [19]

Betts

[11] Patent Number: 5,131,061
[45] Date of Patent: Jul. 14, 1992

[54] MODULAR ACTIVE FIBER OPTIC COUPLER SYSTEM

[75] Inventor: Robert Betts, Vestal, N.Y.

[73] Assignee: International Business Machines Corp., Armonk, N.Y.

[21] Appl. No.: 654,472

[22] Filed: Feb. 13, 1991

[51] Int. Cl.$^5$ .................... G02B 6/00; G02B 6/26
[52] U.S. Cl. .................................. 385/4; 385/15; 359/152
[58] Field of Search .................... 350/96.15-96.16; 455/601, 608, 606; 370/88, 16, 85, 86; 371/8, 11, 68

[56] References Cited

U.S. PATENT DOCUMENTS

| | | | |
|---|---|---|---|
| 4,267,590 | 5/1981 | Bosotti | 370/3 |
| 4,451,916 | 3/1984 | Casper et al. | 370/16 |
| 4,479,701 | 10/1984 | Newton et al. | 350/96.16 |
| 4,511,207 | 4/1985 | Newton et al. | 350/96.16 |
| 4,727,601 | 2/1988 | Konishi | 350/96.16 |
| 4,776,658 | 10/1988 | Normandin | 350/96.15 |
| 4,837,856 | 6/1989 | Glista, Jr. | 455/606 |
| 4,845,722 | 7/1989 | Kent et al. | 370/58 |
| 4,961,620 | 10/1990 | Uken et al. | 350/96.16 X |

*Primary Examiner*—Akm E. Ullah
*Attorney, Agent, or Firm*—Lynn L. Augspurger

[57] ABSTRACT

A modular active fiber optic coupler unit system comprising: a plurality of modular active fiber optic coupler units; each modular active fiber optic coupler unit having an optical input port; an optical output port; an optical transmitter coupled to said optical output port; an optical receiver coupled to said optical input port, an electrical input port; an electrical output port; and logic control elements coupling the said optical transmitter, said optical receiver, said electrical output port and said electrical input port coupled for preventing any electrical input signal on said electrical input port from appearing at the electrical output port; but allowing an electrical input signal to be transmitted as an optical output signal and allowing an optical input signal to become an electrical output; and the system has the electrical output ports of a modular coupler unit of the system coupled to the electrical input ports of a plurality of other couplers, and it the system may be coupled to an unlimited maximum of couplers with an optical signal appearing at any coupler input becoming an electrical signal output at that coupler and consequently becomes an electrical input at all of the other interconnected plurality of modular active fiber optic coupler units.

5 Claims, 3 Drawing Sheets

MODULAR ACTIVE FIBER OPTIC COUPLER SYSTEM

FIELD OF THE INVENTIONS

This invention relates to fiber optic coupling circuitry, and particularly to a modular active fiber optic coupler for coupling of devices in a modular fashion with multiple modular couplers to interconnect devices for signal transmission for optical bus-to-bus transmissions.

BACKGROUND OF THE INVENTION

In the field of linear data busses where fiber optics are employed it has been known to use fiber optics to connect terminal. U.S. Pat. No. 4,837,856, issued to Andrew Glista on Jun. 6, 1989 disclosed a fault-tolerant fiber optic coupler/repeater for use in a terminal in a high speed digital, audio or video (sometimes called a multi-modality) data transmission system which has an optical data input from one or a plurality of upstream terminals and which sends optical data to one or a plurality of downstream terminals via fiber optic lines. There is a bypass line which allows for a bypass of one or more upstream terminals.

U.S. Pat. No. 4,845,722 to Allan R. Kent et al, issued Jul. 4,1989 disclosed a computer interconnect coupler which has a set of junctors which are assigned to channel transmitters and channel receivers for routing of messages from the channel receivers which are addressed to the channel transmitters. This computer interconnect coupler employed crossbar switching. A pair of interconnect couples was provided which were linked together to ensure a mutually consistent definition of a virtual star coupling as well as to share diagnostic information. The patent does not disclose a fiber coupling or any way to allow a "virtual star coupling " to be accomplished by a fiber optic connector in a modular fashion.

Fiber optic circuitry has been employed in a number of specific ways. U.S. Pat. No. 4,511,207 to Steven A. Newton et al issued Apr. 16,1985, proposed to use of a fiber optic data distributor with a one-by-n single mode optical fiber directional coupler to distribute data from a single fiber to a plurality of separate fibers. U.S. Pat. No. 4,479,701 to Steven A. Newton et al issued Oct. 30, 1984, disclosed a fiber optic recirculating memory which used dual couplers to form a splice free recirculating memory device from a single mode optical fiber much in the way delay line memories were formed during the early days of computer development. U.S. Pat. No. 4,451,916 to Paul W. Casper et al issued May 29,1984, proposed a repeated, multi-channel fiber optic communication network for the use of fiber optics as a plurality of full duplex optic channels and one or more auxiliary channels for fault isolation. The system was intended for use in voice/digital data transmissions across the telephone network.

SUMMARY OF THE INVENTIONS

The present inventions are intended to be used as circuitry which permits a potentially infinite number of terminals or other devices on a network to be interconnected without having to redesign the fiber optical modular coupler for each system or number of lines on a bus. The modular connection can be implemented for a fiber optic data bus which has a plurality of signal lines interconnecting various devices in a network. The fiber optic coupler allows unlimited growth and is modular. A system which employs the modular active coupler which I have invented permits interconnection of various numbers of terminal devices without any maximum limit to a fiber optic data bus without regard to any bus protocol and without having to redesign the coupling for each new system. No active fiber optic coupler has been proposed which solves this problem.

The system which I have developed uses the same modular fiber optic active coupler unit. Thus, each network system would have a plurality of modular active fiber optic coupler units; each modular active fiber optic coupler unit having an optical input port; and optical output port; and optical transmitter coupled to said optical output port; and optical receiver coupled to said optical input port, and electrical input port; and electrical output port; and logic control elements coupling the said optical transmitter, said optical receiver, said electrical output port and said electrical input port coupled for preventing an electrical input signal on said electrical input port from appearing at the electrical output port; but allowing an electrical input signal to be transmitted as an optical output signal and allowing an optical input signal to become an electrical output; and the system has one of said electrical output ports of a modular coupler unit of the system being coupled to the electrical input ports of a plurality of other couplers, one of the electrical output ports of a second of said modular coupler units being coupled to the electrical input ports of the other modular coupler units, while one electrical output port of the other modular units is coupled to the electrical input port of the first coupler; said couplers being adapted to transmit therebetween optical signals for coupled devices whereby an optical signal appearing at any coupler optical input becomes an electrical signal output at the coupler and consequently becomes an electrical signal input to all other interconnected plurality of modular active fiber optic coupler units.

BRIEF DESCRIPTION OF THE DRAWINGS

The inventions will be described now in greater detail with reference to the separate sheets of numbered appended drawings in which.

DETAILED DESCRIPTION OF THE PREFERRED EMBODIMENTS

Figure 1:
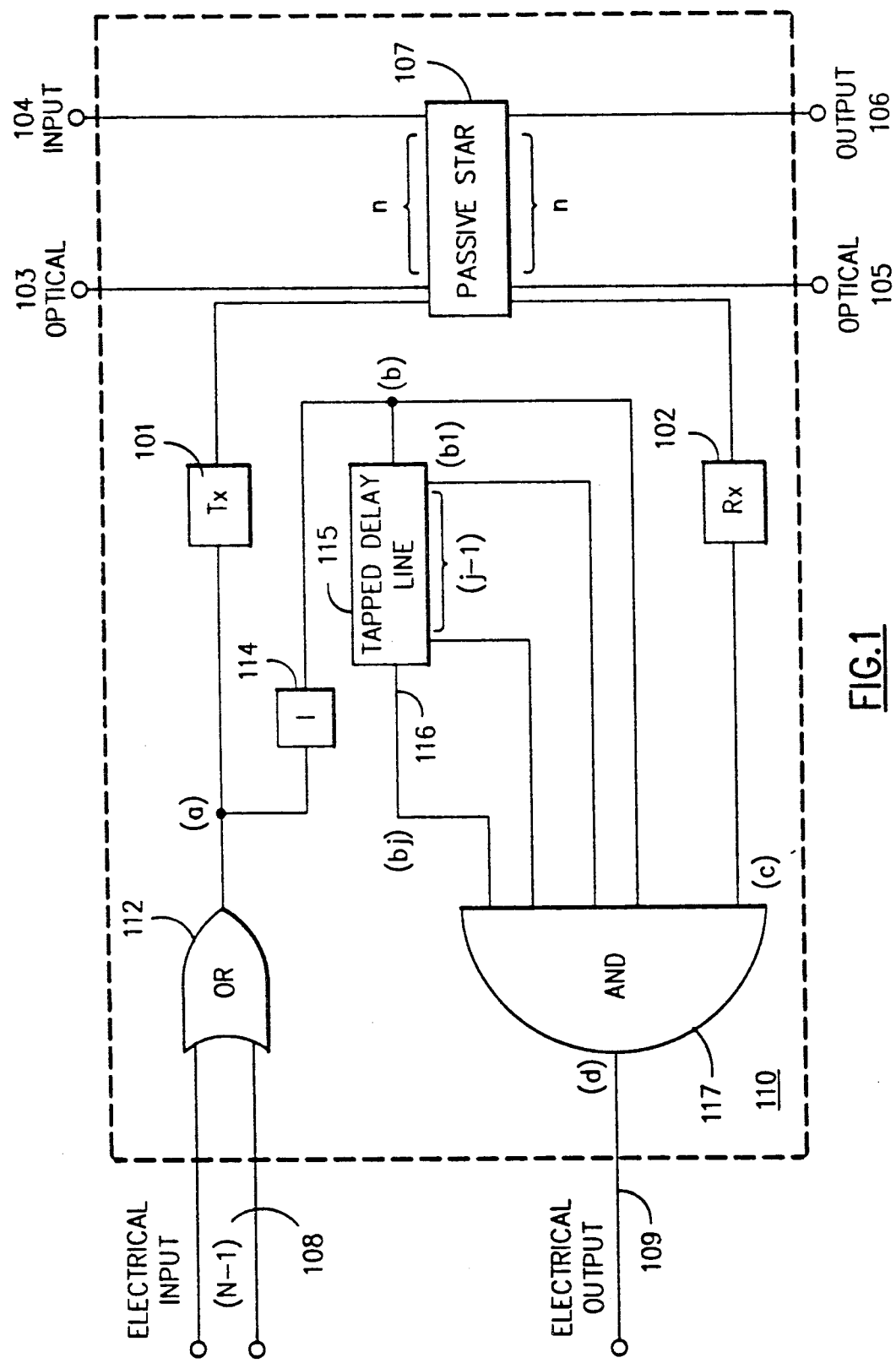
FIG. 1 illustrates generally my preferred embodiment of a basic active coupler with delay requirements among the logical elements.

Turning now to the drawings in greater detail, FIG. 1 shows a block diagram of the basic active coupler with delay requirements among the logical elements. There is provided in each active coupler a function optical transmitter Tx (101) and a functional optical receiver Rx (102) as functional elements of the modular active fiber optical coupler 110. The functional elements may comprise for example for the transmitter element Tx a semiconductor laser or light emitting diode LED. As illustrated by element Rx the functional optical receiver element may be a photodiode with amplifier. Functional element Tx acts as a transmitter, and Rx functions as a receiver, respectively. The input to the Tx element 101 is a logic level signal. Similarly, the output of the Rx element 102 is a logic level signal. The purpose of the internal electrical logic control is to prevent any electrical input signal from appearing at the electrical output, but to allow the electrical signal input to become an optical output and to allow an optical input to become an electrical output.

The modular active coupler 110 in accordance with my preferred embodiment has a plurality of optical input connection ports 103, 104 etc. fiber optic signal line ports of the fiber optic bus which connects to the port coupling to an optical communication network. The modular active coupler 110 also has a plurality of lines coupled to the couplers as optical output connection bus ports 105, 106, for couplings to an optical communication network with the ports connected to the internal electrical logic control of the active modular coupling and to each other by a passive star connector having n port nodes 107 bridging the optical input/output busses under control of the electrical logic. Accordingly, the optical input and output per coupler should be understood to be n couplers, matching the number of lines. Each system can have N couplers without a maximum number of couplers in the system.

The number of electrical inputs 108 to the optical active coupler 110 is N-1. These are coupled to the logic control within the coupler. An electrical output is provided for the coupler. These electrical inputs and output are ports provided for interconnecting the coupler to multiple couplers. The electrical output 109 is provided as a port to a terminal device of the system which is addressed. Only the addressed terminal device has anything with the electrical output signal of the logic control.

As seen in FIG. 1, the logic control is provided with a coupling to the transmitter and receiver, and an OR gate is coupled to the input ports 108 of the coupler for receiving electrical input signals from another active modular coupler.

An AND gate 117 is provided for the logic control and is coupled to the electrical output port 109 for coupling to another modular active coupler element. The output of the OR gate 112 is connected to the transmitter Tx and through the transmitter a passive coupling to the optical output ports. The signal emanating from the OR gate is inverted by inverter 114 and functions as an inverted input to a tapped delay line 115 to which it is coupled. A plurality of outputs j-1, where j is equal to the number of taps on the delay line, as well as a tapped delay line control out 116, is shown for the tapped delay line 115. The input of the tapped delay line emanating from the OR gate and the outputs of the tapped delay line, function as inputs to AND gate 117, as well as the coupled output of the receiver Rx. The tapped delay line control out signal line 116 gates the AND gate off. As coupled to OR gate the delay line blocks any electrical input and prevents it from becoming an electrical output.

The receiver's optical input is coupled to the control port of the passive coupling, as is the optical output of the transmitter. The delay from the OR gate through the transmitter to the receiver to the AND gate is greater than the electrical delay from the OR gate to the AND gate through the electrical tapped delay line of the electrical logic control. The timing of the optical delay less the electrical delay is less than or equal to the maximum time between signal transitions. With regard to timing considerations, ½ the minimum baud time should be considered as the practical limit of the number of taps on the delay line. Accordingly the total delay line time should equal the maximum time between signal transitions plus ½ of the baud time of the transmission network. Power, not shown, is provided for the electrical elements.

When coupled to one another a plurality of X modular active couplers are capable of connecting Xn terminal devices, where n represents the number of input/output lines of the bus port of the coupler. This may be illustrated by FIG. 2 which shows a three coupler system interconnecting 3n terminals.

Figure 2:
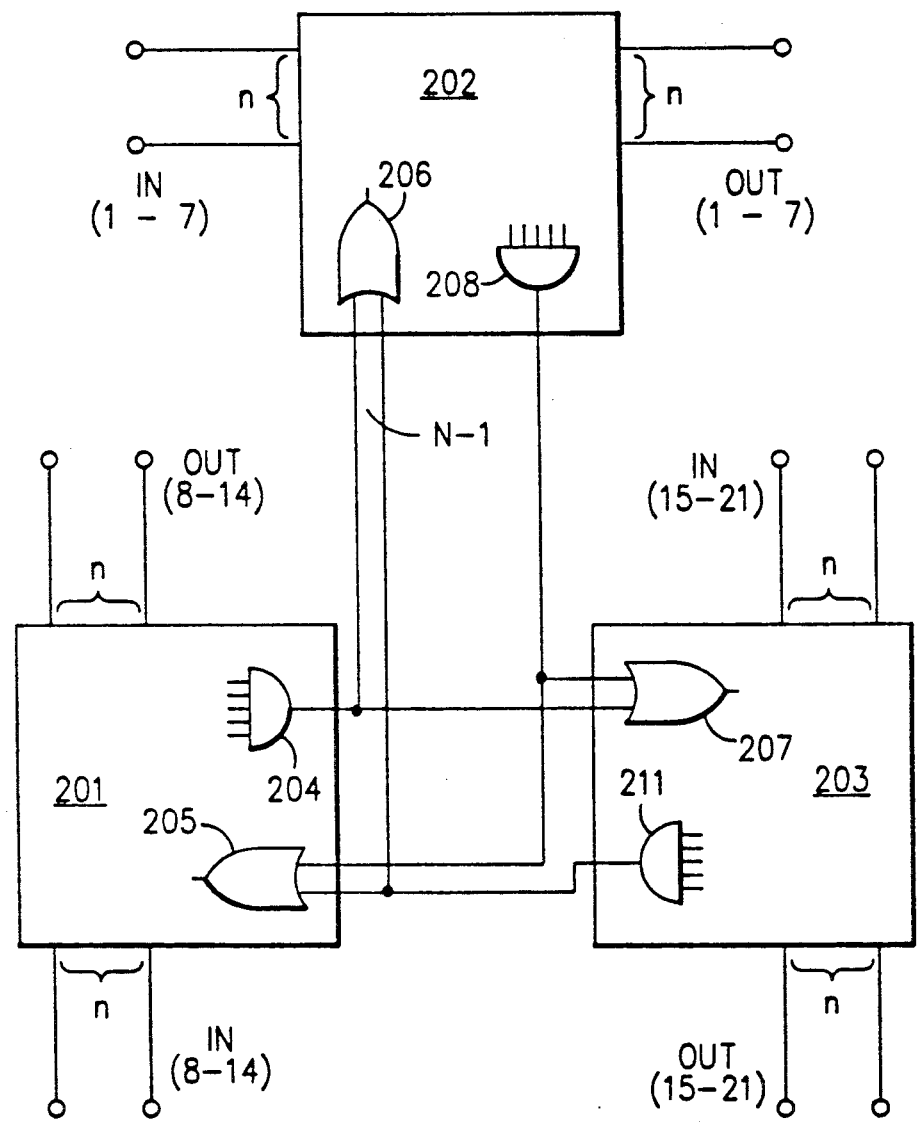
FIG. 2 illustrates a three coupler system interconnecting 3n terminals.

As shown in FIG. 2 the modular active couplers are provided each with seven fiber optic input/output port lines. The electrical output 204 of coupler 201 is coupled to the electrical inputs 206, 207 of couplers 202, 203 respectively. Similarly, coupler electrical output port 208 is coupled to the electrical input ports of coupler 201, 203, while electrical output port 211 is connected to the electrical input port 205,206 of couplers 201, 202. Accordingly, an optical signal appearing at any coupler input becomes an electrical signal output at that coupler and consequently becomes an electrical input at all of the other interconnected couplers. Were it not for the internal logic control of the coupler these electrical inputs would also become electrical outputs at all of the couplers and would also keep circulating potentially forever among the various terminals on the bus. Since the bus traffic is "bursty" data, the Tx/Rx combinations are effectively dc coupled. The purpose of the delay line is to overlap signals at the input to the "AND" circuit such that it will block any electrical input signal from becoming an electrical output.

Figure 3:
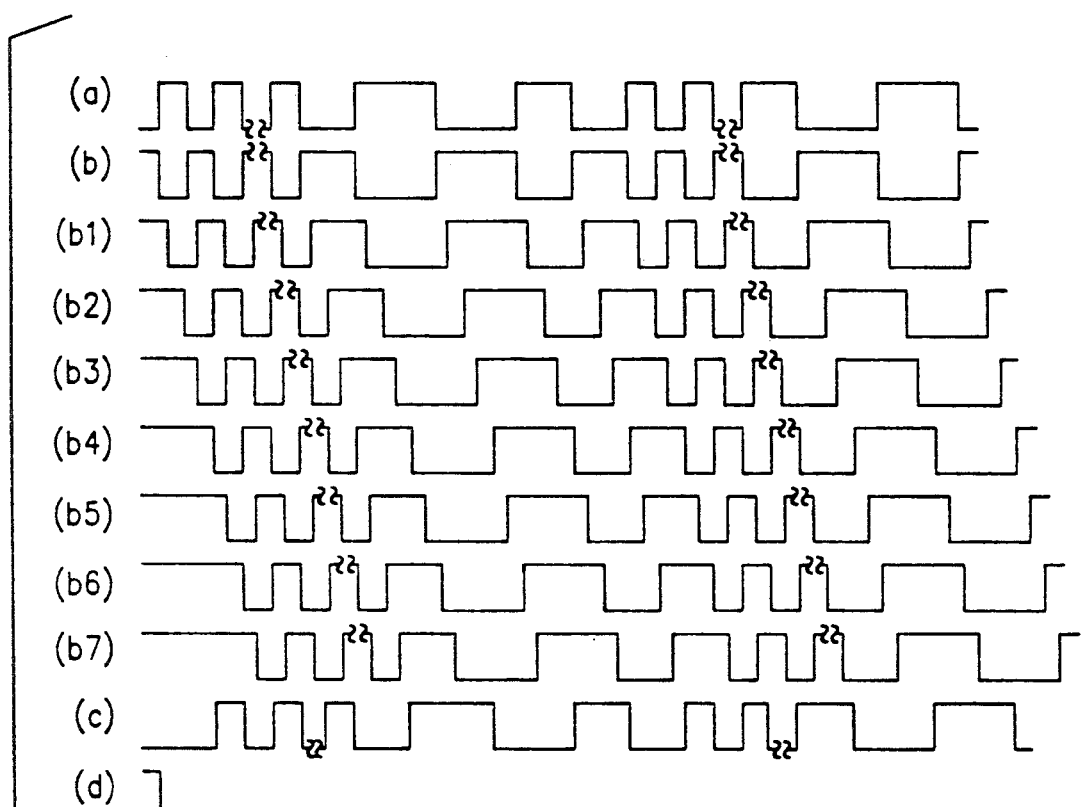
FIG. 3 shows as an example waveforms for a fiber optic bus application.

FIG. 3 shows waveforms for the currently preferred fiber optic bus application, illustrated by way of example. The timing discussed hereinbefore with reference to FIG. 1 is tied by common reference alphabetic identification (a), (b), (b1), (b2), (b3), (b4), (b5), (b6), (b7), (c) and (d) to the signal lines shown in FIG. 3. Signal (c) is understood to be blocked at 301, while signal (d) is the signal emanating from the final gate.

While I have disclosed these inventions by way of illustration of the preferred embodiment, the accompanying claims should be understood to encompass all the breadth that can be construed, protecting the inventions to the fullest extend possible under the law in light of existing prior work of others. Those skilled in the art upon reading this disclosure, both now and in the future, will undoubtedly conceive of further adaptations and improvements, even by way of invention, which fall within the intended scope of the claims.

What is claimed is:

1. A modular active fiber optic coupler system comprising:
   a plurality of modular active fiber optic coupler units, each modular active fiber optic coupler unit having an optical input port;
   an optical output port;
   an optical transmitter coupled to said optical output port;
   an optical receiver coupled to said optical input port;
   an electrical input port;
   an electrical output port; and
   logic control means coupling the said optical transmitter said optical receiver, said electrical ouput port and said electrical input port for preventing any electrical input signal on said electrical input port from appearing at the electrical output port, but allowing an electrical input signal to be transmitted as an optical output signal and allowing an optical input signal to become an electrical output; and wherein said system has one of said electrical output ports of a modular coupler unit of the system being coupled to the electrical input ports of a plurality of other couplers;

one of the electrical ouput ports of a second of said modular coupler units being coupled to the electrical input ports of the other modular coupler units, while one electrical ouput port of said other modular units is coupled to the electrical input port of said first coupler;

said couplers being adapted to transmit therebetween optical signals for coupled devices whereby an optical signal appearing at any coupler optical input becomes an electrical signal ouput at that coupler and consequently becomes an electrical signal input to all other interconnected plurality of modular active fiber optic coupler units.

2. A modular active fiber optic coupler system according to claim 1 wherein any optical signal appearing at any coupler input becomes an electrical signal output at that coupler and consequently becomes an electrical input at all of the other interconnected couplers.

3. An modular active fiber optic coupler system according to claim 5 wherein said logic control means includes an OR gate coupled to receive signals via said electrical input port, and AND gate coupled to said electrical output port for transmitting via said electrical output port an electrical signal, and internal electrical logic means for overlapping signals at the input to the AND gate such that said internal electrical logic means blocks any electrical input signal from becoming an electrical ouput signal, while permitting an electrical input signal to be converted to an optical output signal by said optical transmitter for transmission via said optical output port.

4. A modular active fiber optic coupler system according to claim 5 wherein a logic delay line means provided for said logic control means blocks any electrical signal from becoming an electrical output signal, while permitting an electrical input signal to be converted to an optical output signal by said optical transmitter for transmission via said optical output port.

5. A modular active fiber optic coupler system according to claim 3 wherein delay means are provided for said logic control means whereby the delay from said OR gate through the transmitter to said receiver and to the coupled AND gate is greater than the electrical delay from the OR gate to the AND gate through the electrical delay means, and wherein the timing of the optic delay less the electrical delay is less than or equal to the maximum time between signal transitions.

* * * * *